(12) United States Patent
Bitar

(10) Patent No.: US 8,664,794 B2
(45) Date of Patent: Mar. 4, 2014

(54) COAXIAL WIND TURBINE

(75) Inventor: Peter V. Bitar, Anderson, IN (US)

(73) Assignee: Peter V. Bitar, Anderson, IN (US)

( * ) Notice: Subject to any disclaimer, the term of this patent is extended or adjusted under 35 U.S.C. 154(b) by 0 days.

(21) Appl. No.: 13/252,277

(22) Filed: Oct. 4, 2011

(65) Prior Publication Data

US 2012/0019006 A1 Jan. 26, 2012

Related U.S. Application Data

(63) Continuation of application No. PCT/US2010/029610, filed on Apr. 1, 2010.

(60) Provisional application No. 61/166,791, filed on Apr. 6, 2009.

(51) Int. Cl.
*F03D 9/00* (2006.01)

(52) U.S. Cl.
USPC .............................. 290/55; 290/1 C

(58) Field of Classification Search
USPC .............. 290/44, 55, 1 C, 4 R, 4 A, 4 C, 4 D; 416/128; 74/665 L, 665 M
See application file for complete search history.

(56) References Cited

U.S. PATENT DOCUMENTS

| | | | | |
|---|---|---|---|---|
| 2,563,279 A | * | 8/1951 | Rushing | 415/4.3 |
| 2,667,232 A | * | 1/1954 | Woolley | 180/447 |
| 2,768,757 A | * | 10/1956 | Barry | 414/540 |
| 2,927,472 A | * | 3/1960 | Grant | 74/378 |
| 3,478,620 A | * | 11/1969 | Shimanckas | 74/665 GB |
| 3,688,594 A | | 9/1972 | Weber | |
| 3,703,642 A | * | 11/1972 | Balaguer | 290/43 |
| 4,039,848 A | * | 8/1977 | Winderl | 290/55 |
| 4,090,413 A | * | 5/1978 | Vickland | 74/665 GB |
| 4,186,312 A | * | 1/1980 | Dvorak | 290/4 R |
| 4,311,435 A | * | 1/1982 | Bergero | 416/170 R |
| 4,438,343 A | * | 3/1984 | Marken | 290/53 |
| 4,588,040 A | * | 5/1986 | Albright et al. | 180/165 |

(Continued)

FOREIGN PATENT DOCUMENTS

| | | |
|---|---|---|
| DE | 2932293 A1 | 2/1982 |
| GB | 758628 A | 10/1956 |

(Continued)

OTHER PUBLICATIONS

Korean Intellectual Property Office; International Search Report dated Nov. 17, 2010 from related PCT Application No. PCT/US2010/029610.

(Continued)

*Primary Examiner* — Tulsidas C Patel
*Assistant Examiner* — Viet Nguyen
(74) *Attorney, Agent, or Firm* — Woodard, Emhardt, Moriarty, McNett & Henry LLP

(57) ABSTRACT

Disclosed is a gearbox with two driver gears that are phase shifted 180 degrees with respect to a driven gear so that counter-rotation of the driver gears combine to rotate the driven gear together. The gearbox can be used to couple a counter-rotating, coaxial wind turbine rotors by coupling the driver gears to the counter-rotating rotors and the driven gear to a generator so that the counter-rotating rotors on the wind turbine rotate the driven gear in the same direction. The driven gear can be coupled to a generator to produce electricity.

21 Claims, 11 Drawing Sheets

(56) References Cited

U.S. PATENT DOCUMENTS

| | | | |
|---|---|---|---|
| 5,024,639 A * | 6/1991 | Crispo | 475/221 |
| 5,040,429 A * | 8/1991 | Del Castillo | 74/424 |
| 5,233,886 A * | 8/1993 | Bossler, Jr. | 74/665 F |
| 5,506,453 A * | 4/1996 | McCombs | 290/44 |
| 6,093,131 A | 7/2000 | Rohs | |
| 6,132,272 A | 10/2000 | Rinzaki et al. | |
| 6,186,922 B1 * | 2/2001 | Bursal et al. | 476/18 |
| 6,220,906 B1 * | 4/2001 | Dubois | 440/81 |
| 6,517,395 B1 * | 2/2003 | Higby et al. | 440/75 |
| 6,540,570 B1 * | 4/2003 | Eakin | 440/37 |
| 6,563,229 B2 * | 5/2003 | Farkas | 290/30 A |
| 6,602,054 B1 * | 8/2003 | Sherman | 416/99 |
| 6,688,925 B2 * | 2/2004 | Garcia | 440/8 |
| 6,960,107 B1 * | 11/2005 | Schaub et al. | 440/75 |
| 7,199,484 B2 * | 4/2007 | Brashears | 290/54 |
| 7,227,276 B2 * | 6/2007 | Caiozza | 290/55 |
| 7,503,818 B1 * | 3/2009 | Hagan | 440/81 |
| 7,517,264 B2 * | 4/2009 | Carr | 440/75 |
| 2006/0093482 A1 | 5/2006 | Wacinski | |
| 2007/0297903 A1 * | 12/2007 | Morris | 416/132 A |
| 2008/0056897 A1 | 3/2008 | Anderson | |
| 2008/0236332 A1 * | 10/2008 | Hoose et al. | 74/810.1 |
| 2009/0322085 A1 * | 12/2009 | Renaud | 290/44 |
| 2010/0029428 A1 * | 2/2010 | Abe et al. | 475/5 |
| 2010/0215502 A1 * | 8/2010 | Harrison | 416/205 |
| 2010/0296929 A1 * | 11/2010 | Shuto et al. | 416/128 |

FOREIGN PATENT DOCUMENTS

| | | |
|---|---|---|
| GB | 1481699 A | 8/1977 |
| NL | 8204337 A | 6/1984 |
| WO | 96-18815 A1 | 6/1996 |
| WO | 01/55590 A1 | 8/2001 |

OTHER PUBLICATIONS

Korean Intellectual Property Office; Written Opinion dated Nov. 17, 2010 received in related PCT Application No. PCT/US2010/029610.

* cited by examiner

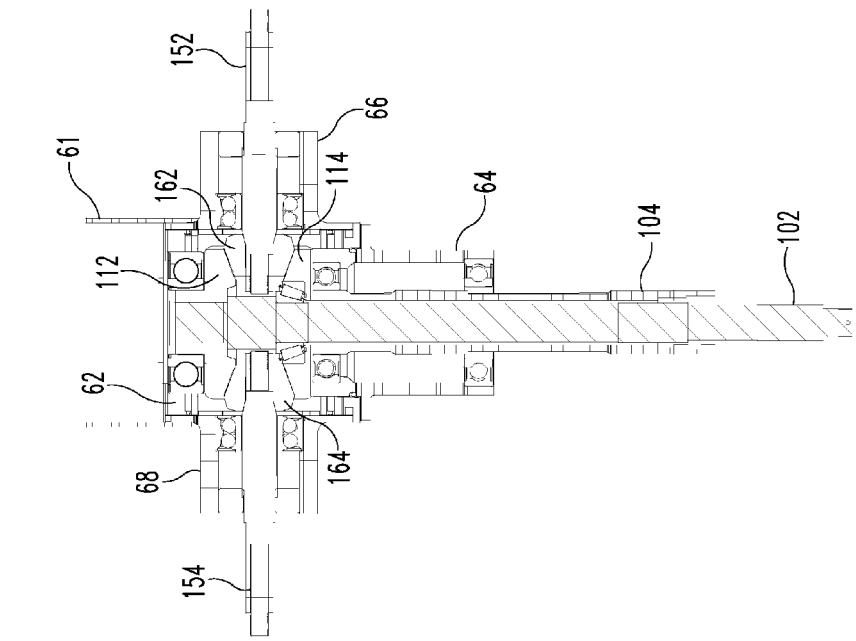
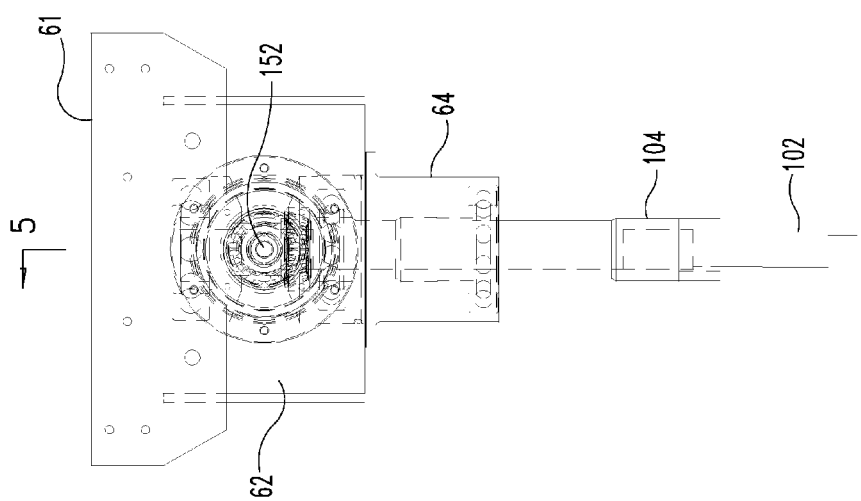
*Fig. 5*
*Fig. 4*

COAXIAL WIND TURBINE

CROSS REFERENCE TO RELATED APPLICATIONS

The present application is a continuation of PCT/US2010/029610 filed Apr. 1, 2010, PCT/US2010/029610 claims the benefit of U.S. Provisional Patent Application Ser. No. 61/166,791 filed Apr. 6, 2009.

FIELD OF THE INVENTION

This disclosure is related to coaxial wind turbines.

BACKGROUND

A wind turbine converts the kinetic energy in wind into mechanical energy that is then converted by a generator into electricity. A coaxial wind turbine utilizes a second counter-rotating rotor to increase the amount of kinetic energy converted from a particular patch of sky.

BRIEF DESCRIPTION OF THE DRAWINGS

FIG. 4 is a side elevational view of a gearbox.
FIG. 5 is a cross-sectional view of the FIG. 4 gearbox along section lines 5-5.

DETAILED DESCRIPTION OF THE DRAWINGS

Figure 1:
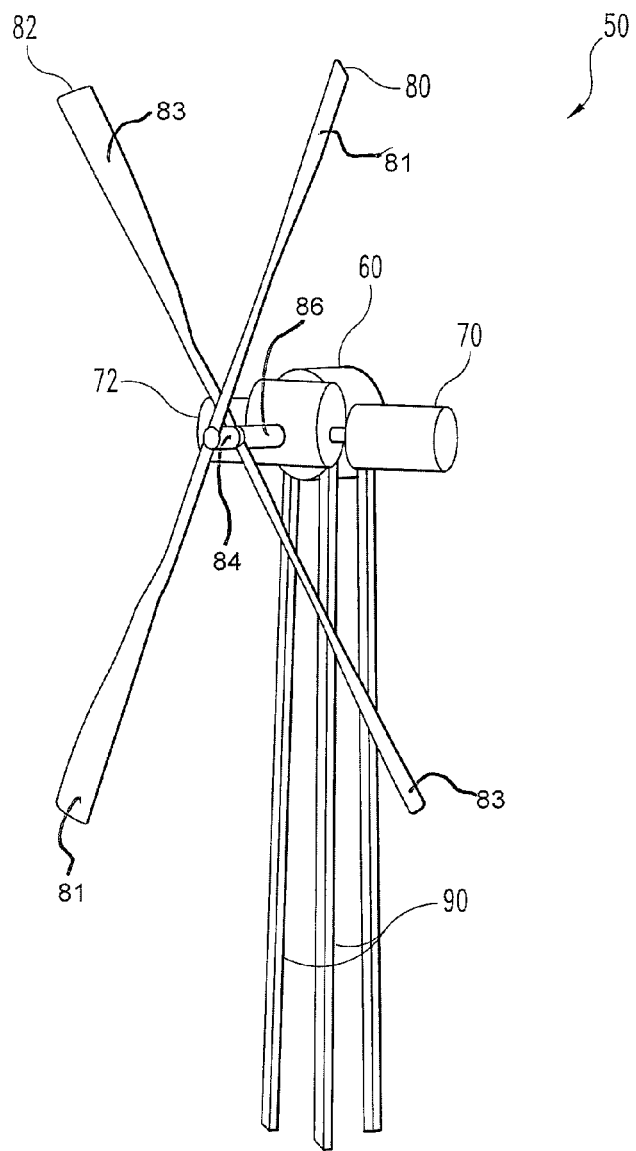
FIG. 1 is a perspective view of a horizontal wind turbine.

For the purpose of promoting an understanding of the claims, reference will now be made to certain embodiments thereof and specific language will be used to describe the same. It will nevertheless be understood that no limitation of the scope of this disclosure and the claims is thereby intended, such alterations, further modifications and further applications of the principles described herein being contemplated as would normally occur to one skilled in the art to which the disclosure relates. In several figures, where there are the same or similar elements, those elements are designated with the same or similar reference numerals.

Figure 2:
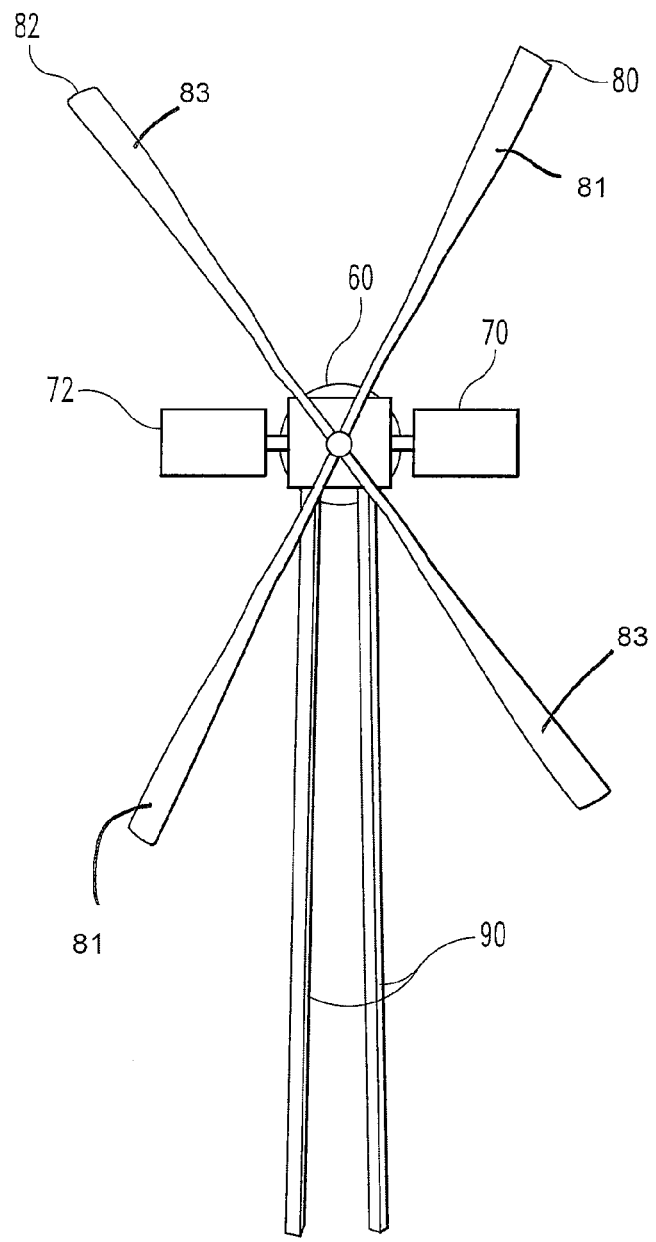
FIG. 2 is a front elevational view of the FIG. 1 wind turbine.
Figure 3:
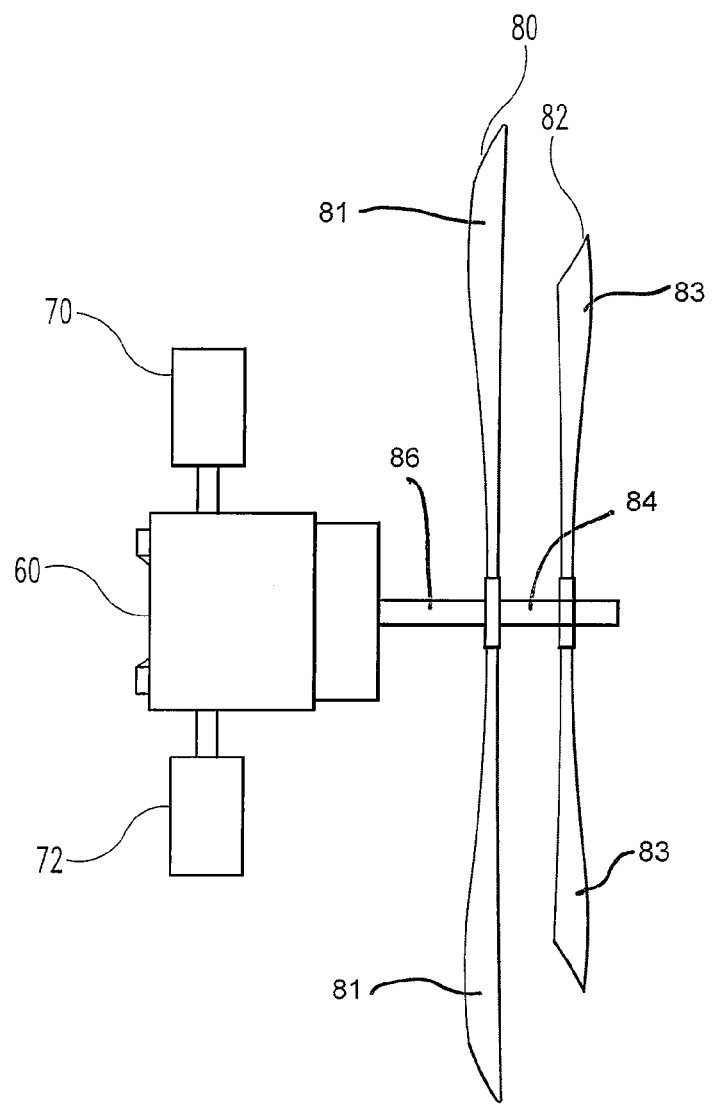
FIG. 3 is a top plan view of the FIG. 1 wind turbine.

FIGS. 1-3 illustrate horizontal wind turbine 50 which includes gear box 60, generators 70 and 72, counter-rotating rotors 80 and 82 and support structure 90. Rotor 80 includes blades 81 attached to shaft 84. Rotor 82 includes blades 83 attached to shaft 86. As illustrated, blades 81 and 83 on rotors 80 and 82 are pitched to rotate in opposite directions when both are coaxially mounted in an airflow (wind). Generators 70 and 72 are positioned at a substantially right angle to gear box 60. Wind turbine 50 is a horizontal-axis wind turbine with rotors 80 and 82 pointed into the wind. While not specifically discussed here, the means for maintaining the orientation of rotors 80 and 82 with respect to the wind can be any means known in the art, including use of a wind sensor coupled to a servo motor (not illustrated) or even a simple wind vane (not illustrated).

In other embodiments, generators 70 and 72 can be remotely located with appropriate transmission between rotors 80 and 82 and generators 70 and 72.

Referring now to FIGS. 4-7, gear box 60 is illustrated. Gear box 60 includes mounting bracket 61, housings 62, 64, 66 and 68, inner drive shaft 102, outer drive shaft 104, driver gears 112 and 114, output shafts 152 and 154, driven gears 162 and 164.

Driver gear 112 is coupled to inner drive shaft 102 and driver gear 114 is coupled to outer drive shaft 104. Inner drive shaft 102 and outer drive shaft 104 are coupled to rotors 80 and 82. As such, inner drive shaft 102 and outer drive shaft 104 are counter-rotating. Driven gears 162 and 164 are positioned on opposite sides of inner drive shaft 102 and are engaged between driver gears 112 and 114. Counter rotation of driver gears 112 and 114 rotates driven gears 162 and 164 because the location where driver gear 112 engages each driven gear is phase shifted 180 degrees from the location where driver gear 114 engages each driven gear (the driver gears are located on opposing sides of the driven gears). This configuration permits both driver gears 112 and 114 to power rotation of the driven gears.

Driver gears 112 and 114 and driven gears 162 and 164 are beveled friction gears. In one embodiment, these beveled friction gears are constructed of a hardened steel material. In yet another embodiment, they may be constructed of a ceramic material. In other embodiments, other materials appropriate for friction gears may be utilized. In yet other embodiments, driver gears 112 and 114 and driven gears 162 and 164 are beveled gears with intermeshing teeth.

Figure 7:
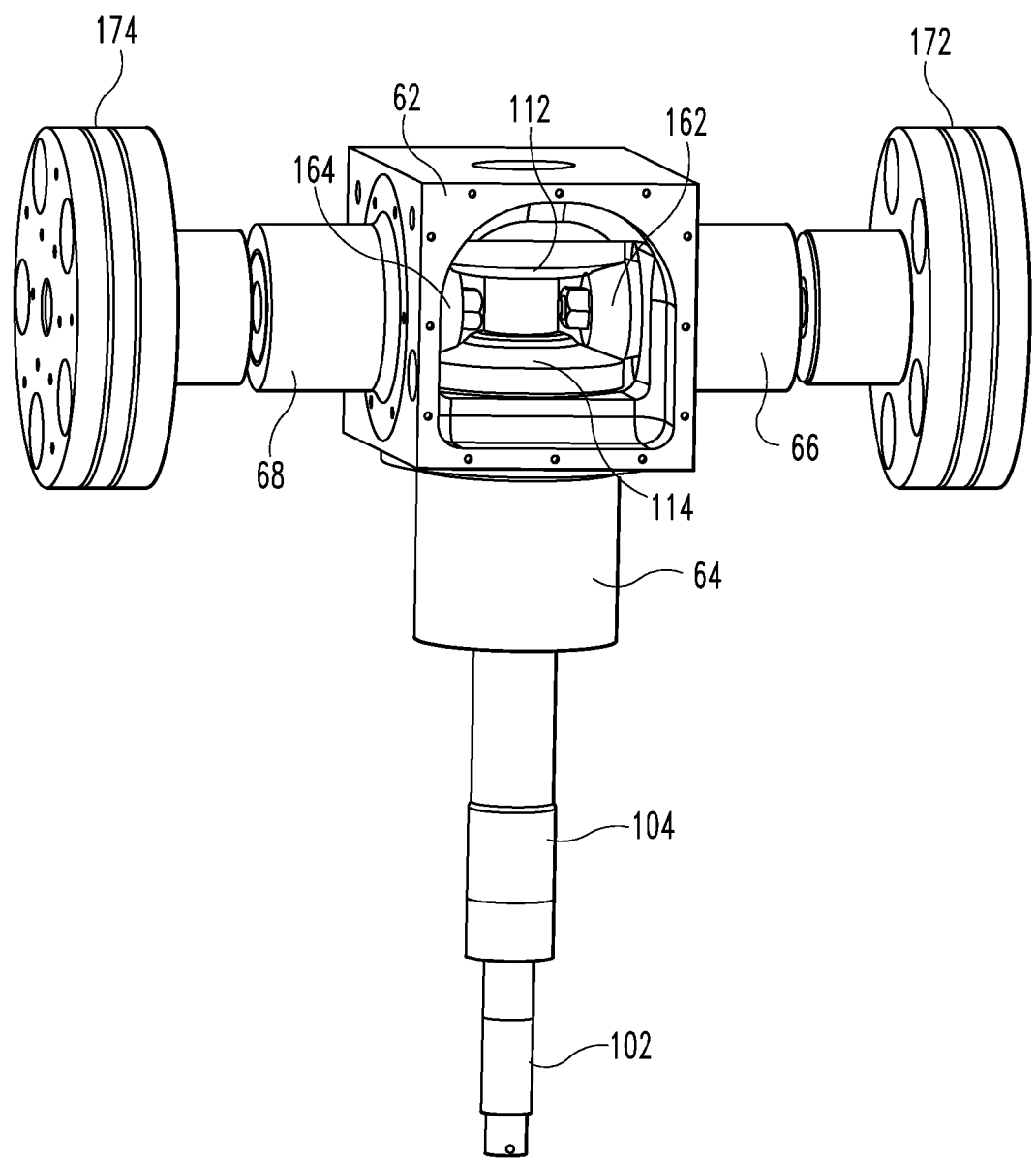
FIG. 7 is a perspective view of the FIG. 4 gearbox with a cut away section.
Figure 8:
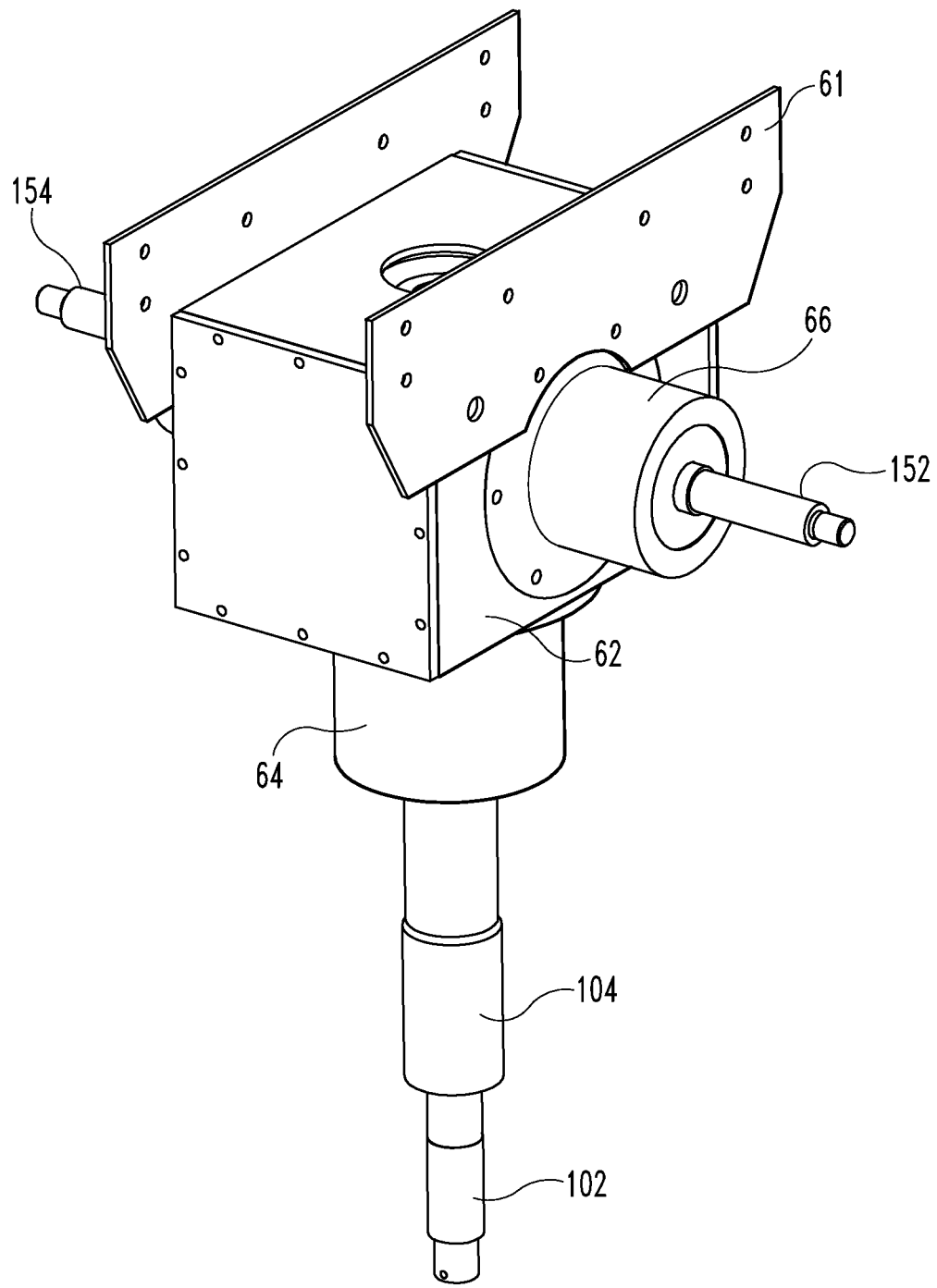
FIG. 8 is a perspective view of the FIG. 4 gearbox.

Output shafts 152 and 154 are coupled either directly or indirectly to generators 70 and 72. For example, in one embodiment output shafts 152 and 154 are directly coupled to generators 70 and 72. In this embodiment, generator 70 and 72 could be controllably engaged or disengaged with gear box 60 by moving driven gear 162 and/or 164 into or out of engagement with driver gears 112 and 114. As illustrated in FIG. 7, friction clutches 172 and 174 are optionally located between output shaft 152 and generator 70 and output shaft 154 and generator 72. This embodiment permits controlled engagement and disengagement of generator 70 and/or 72 with output shaft 154 and/or 152 via operation of friction clutches 172 and/or 174. In addition, additional gearing can be included between gear box 60 and generators 70 and 72 to match the generator operational RPM to the rotation speed of rotors 80 and 82.

This configuration permits variations in the configuration of wind turbine 50. For example, because the power output from rotors 80 and 82 can be divided between multiple output shafts, generator 70 and 72 can be sized below the total output potential for wind turbine 50 permitting the use of comparatively smaller generators as compared to use of a single generator. In another embodiment, generator 70 and/or 72 can be optionally engaged to permit optimization of power output of wind turbine 50 for different wind conditions. For example, in comparatively lower speed wind operating conditions, one generator may be disengaged from gear box 70 permitting maximum power to the other generator. In comparatively higher wind speed operating conditions, generators 70 and 72 may be both engaged with gear box 60 to maximize the power output of wind turbine 50.

In other embodiments, additional output shafts may be added to increase this variable capacity beyond two generators. For example, additional output shafts and driven gears may be positioned at approximate perpendicular angle to output shafts 152 and 154 in a cruciform configuration. In other embodiments, housing 62 can be configured in other shapes (as viewed from the axis of drive shafts 102 and 104) such as hexagon, pentagon, octagon, decagon, etc., permitting the use of additional output shafts and the controllable engagement or disengagement of additional generators. As many output shafts as will fit between driver gears 112 and 114 may be used. In addition, the size of driver gears 112 and 114 can be varied to make space for additional output shafts.

In various embodiments, the number of output shafts are variable individually including having a single output shaft and driven gear coupled to driver gears 112 and 114.

Due to the friction coupling between driver gears 112 and 114 and driven gears 162 and 164, inner driver shaft 102 and outer driver shaft 104 will generally be constrained to revolve at approximately the same rotation speed which in turn generally constrains rotors 80 and 82 to revolve at the same speed.

In the illustrated embodiment rotors 80 and 82 are configured with two blades. In other embodiments, other rotor configurations can be three or four blades. Other embodiments can use any number of blades that may be desired for rotors 80 and 82. In one embodiment, rotor 82 may have a slightly increased surface area as compared to rotor 80 to more efficiently capture air flow that has been disrupted by rotor 80. In yet other embodiments, the comparative pitch between rotor 80 and rotor 82 may be varied. These embodiments may optimize performance with gear box 60 that generally constrains rotor 80 and rotor 82 to revolve at the same speed.

Figure 9:
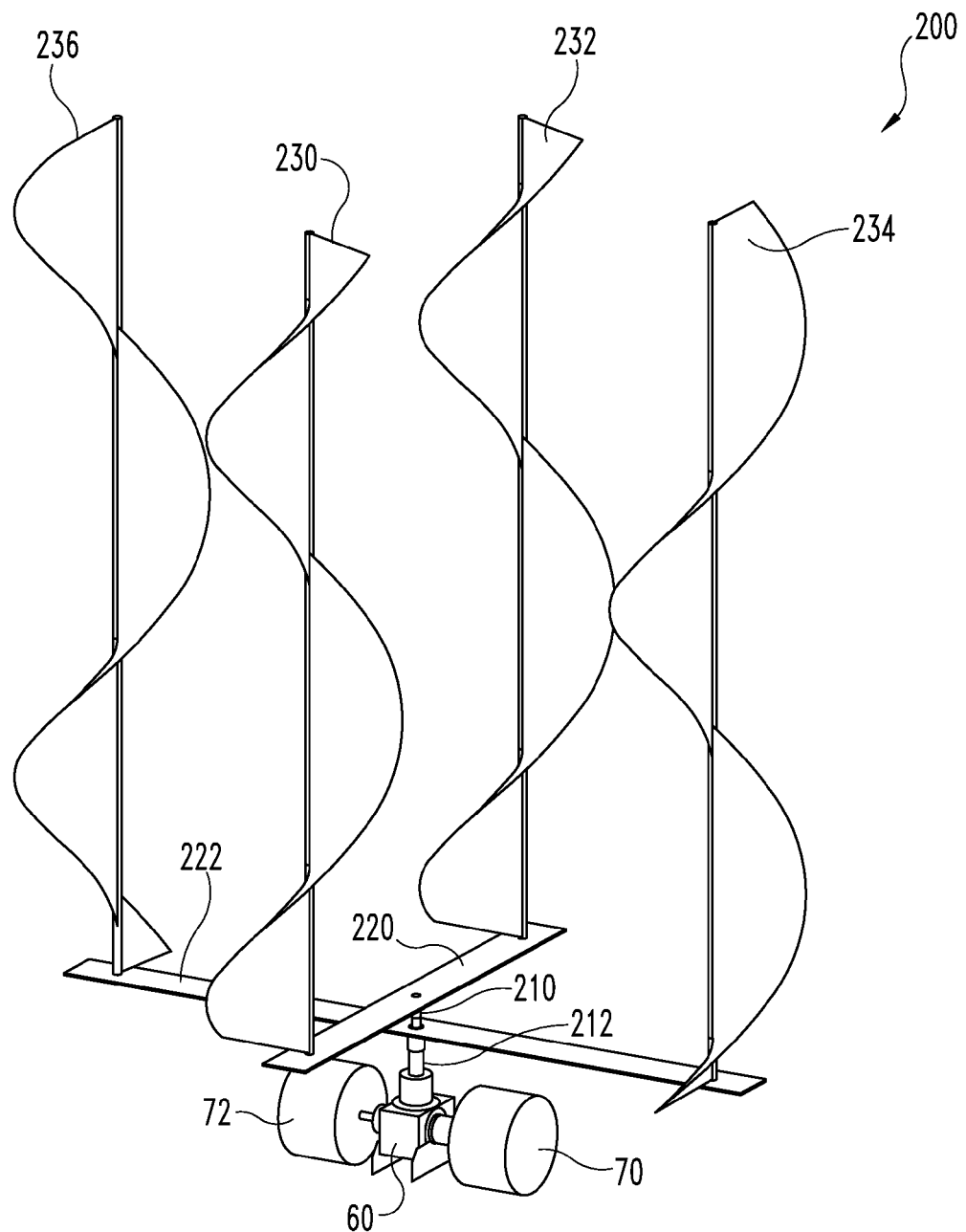
FIG. 9 is a perspective view of a vertical wind turbine.
Figure 10:
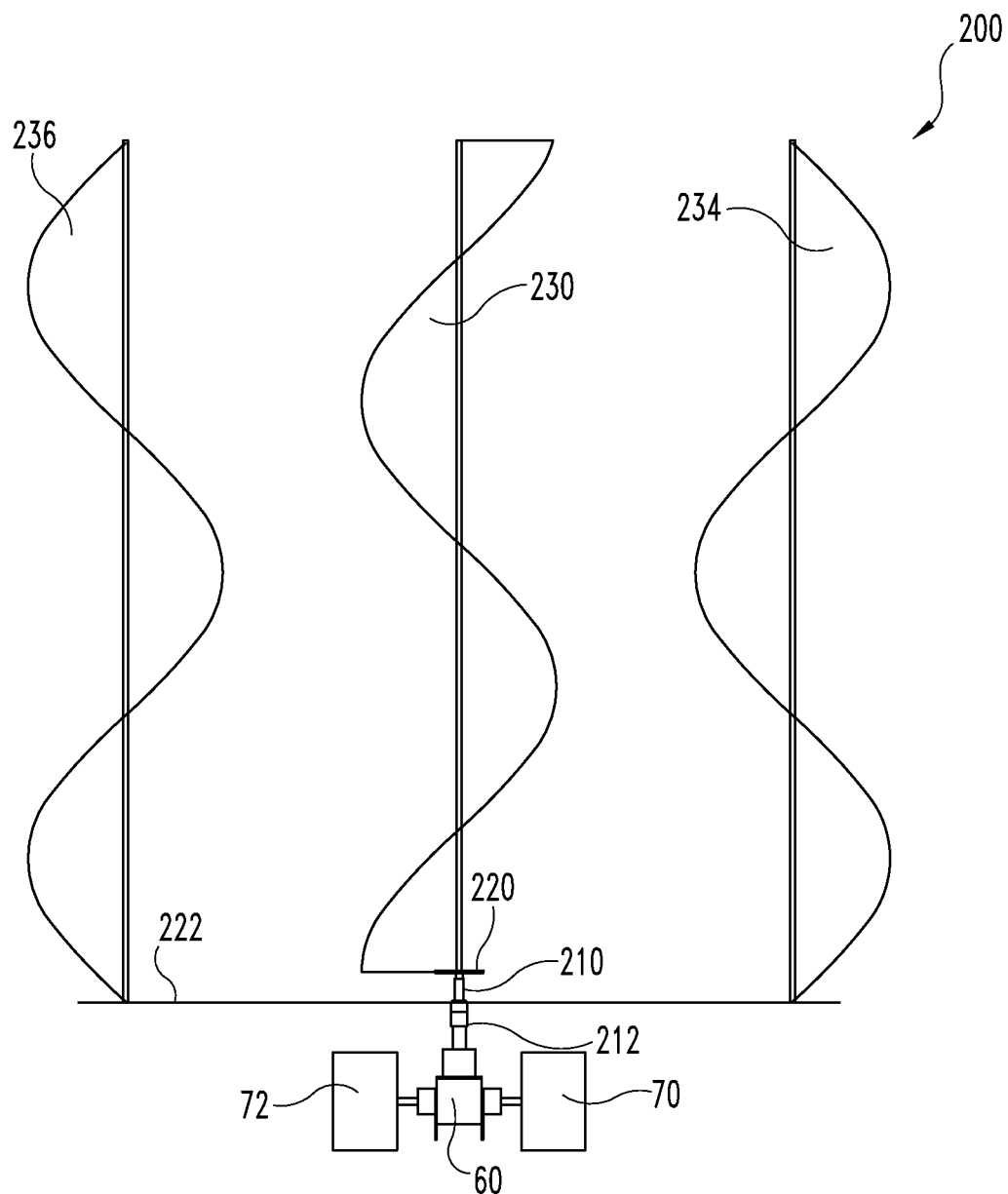
FIG. 10 is a front elevational view of the FIG. 9 wind turbine.
Figure 11:
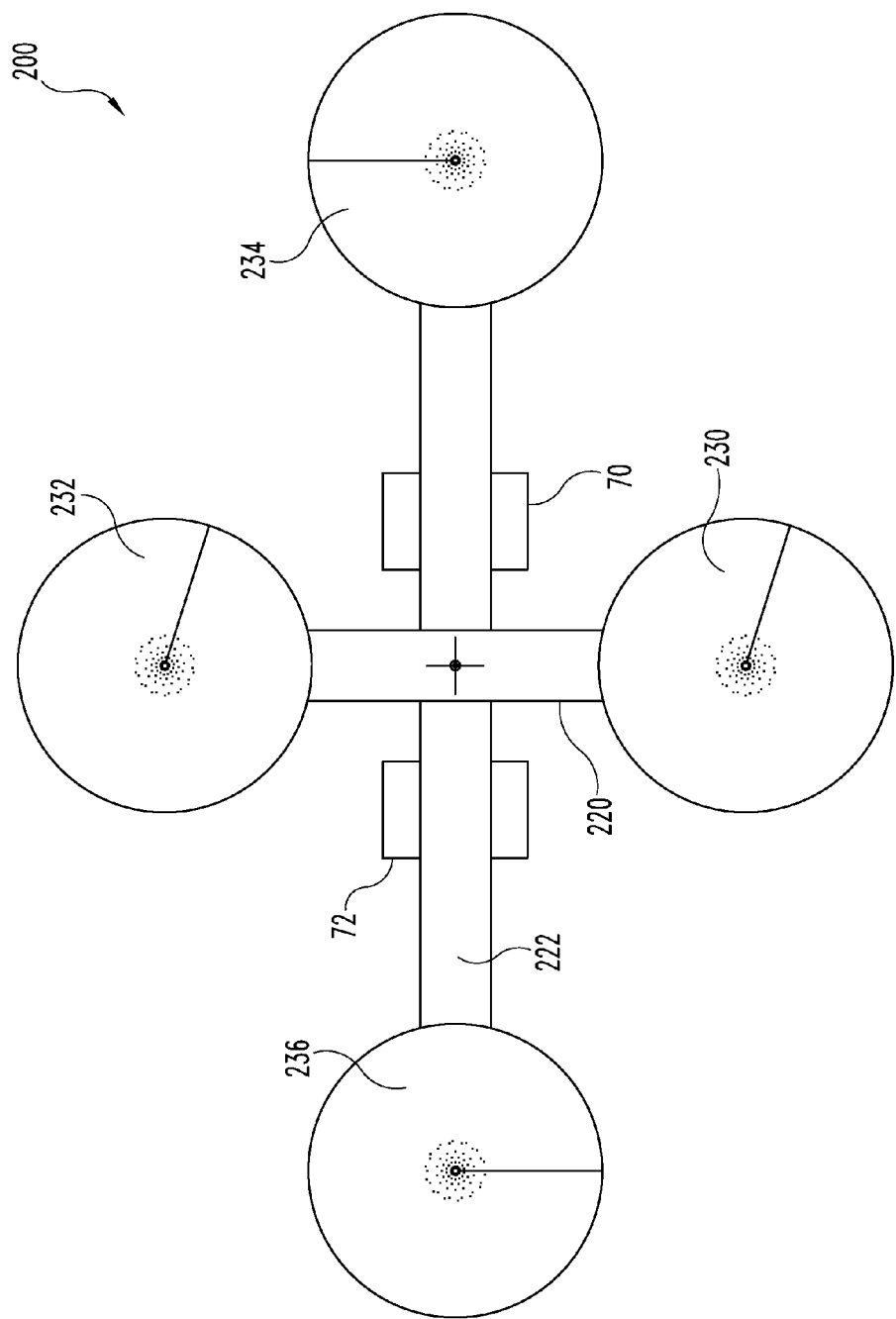
FIG. 11 is a top plan view of the FIG. 9 wind turbine.

Referring now to FIGS. 9-11, vertical wind turbine 200 is illustrated. Vertical wind turbine 200 includes gear box 60, generators 70 and 72, counter rotating supports 220 and 222 mounting rotors 230, 232, 234 and 236. Rotors 230 and 232 are mounted on support 220 and rotors 234 and 236 are mounted on support 222. Rotors 230, 232, 234 and 236 are configured and arranged so that supports 220 and 222 rotate in opposite directions when in a wind.

Support 220 is rotationally coupled to gear box 60 via inner drive shaft 210 and support 220 is rotationally coupled to gear box 60 via outer drive shaft 212. Inner drive shaft 210 and outer drive shaft 212 interface in gear box 60 in the same way that inner drive shaft 102 and outer drive shaft 104, described above, do. Gear box 60 and generators 70 and 72 are functionally the same as those described above with regard to FIGS. 1-8, although the orientation is different (vertical instead of horizontal).

In the illustrated embodiment, rotors 230, 232, 234 and 236 are helically shaped members. Alternative embodiments can use other rotor configurations. In one embodiment, rotors 230, 232, 234 and 236 can be constructed of a solar cell membrane capable of converting light into electricity to augment the power production of vertical wind turbine 200.

In alternative embodiments, rotors 230 and 232 can be configured differently from rotors 234 and 236 to account for the disruption of the air flow by rotors 234 and 236 before encountering rotors 230 and 232 and also to account for differences in the distance from the center in which the rotors are mounted to achieve substantially equal angular velocities for supports 210 and 212.

While not illustrated, vertical wind turbine 200 can include structural supports. For example, additional horizontal supports can be located on top of rotors 230, 232, 234 and 236 to reduce deflection of individual rotors 230, 232, 234 and 236 in high wind conditions.

Figure 12:
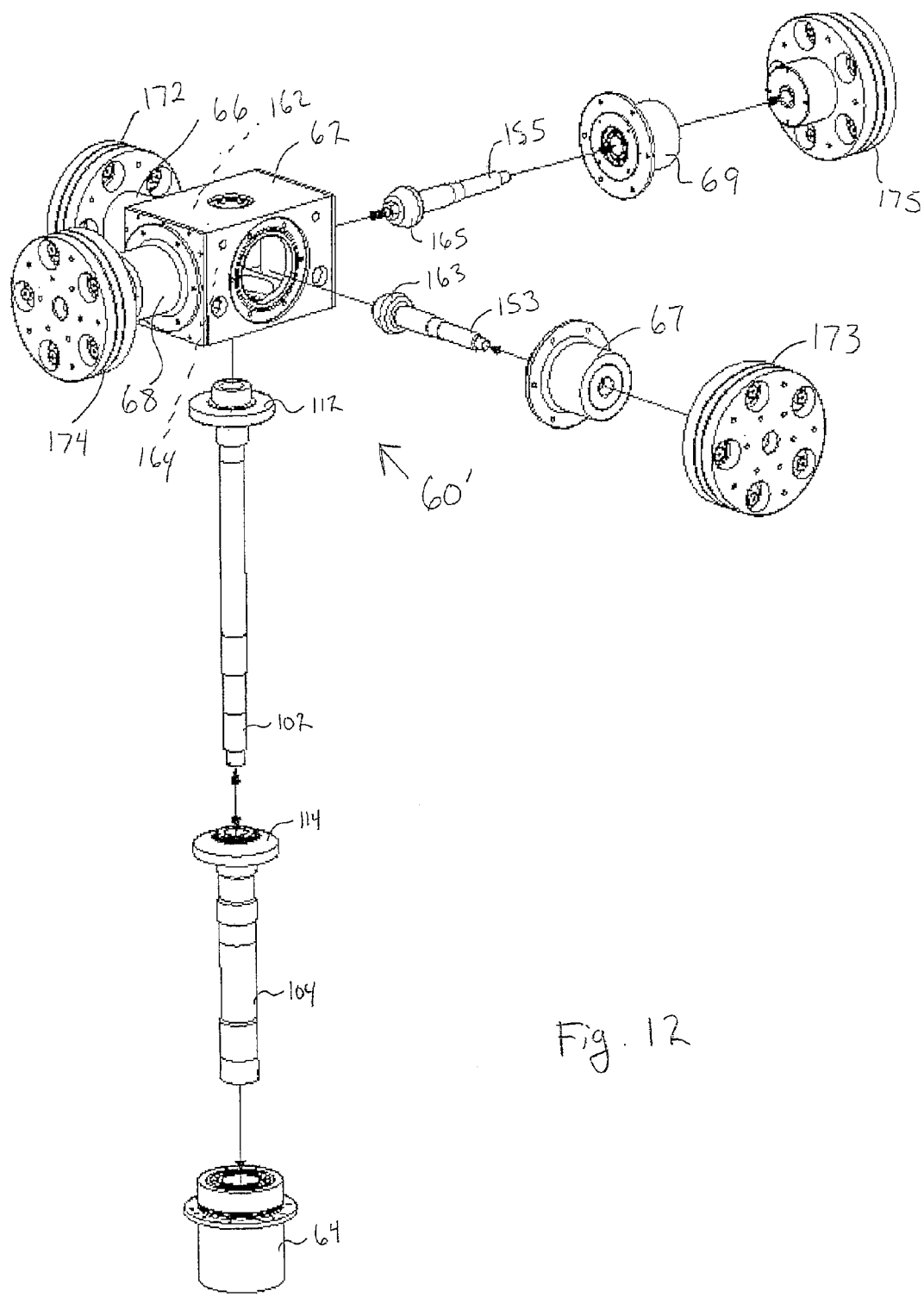
FIG. 12 is an exploded perspective assembly view of an alternative embodiment of a gearbox.

Referring now to FIG. 12, gear box 60' is illustrated. Gear box 60' includes housings 62, 64, 66, 67, 68 and 69, inner drive shaft 102, outer drive shaft 104, driver gears 112 and 114, output shafts 153 and 155, driven gears 162, 163, 164 and 165 and friction clutches 172, 173, 174 and 175.

Driver gear 112 is coupled to inner drive shaft 102 and driver gear 114 is coupled to outer drive shaft 104. Inner drive shaft 102 and outer drive shaft 104 are coupled to rotors 80 and 82. As such, inner drive shaft 102 and outer drive shaft 104 are counter-rotating. Driven gears 163 and 165 engage between driver gears 112 and 114. Counter rotation of driver gears 112 and 114 rotates driven gears 163 and 165 because the location where driver gear 112 engages each driven gear is phase shifted 180 degrees from the location where driver gear 114 engages each driven gear (the driver gears are located on opposing sides of the driven gears). This configuration permits both driver gears 112 and 114 to power rotation of the driven gears.

Driver gears 112 and 114 and driven gears 163 and 165 are beveled friction gears. In one embodiment, these beveled friction gears are constructed of a hardened steel material. In yet another embodiment, they may be constructed of a ceramic material. In other embodiments, other materials appropriate for friction gears may be utilized. In yet other embodiments, driver gears 112 and 114 and driven gears 163 and 165 are beveled gears with intermeshing teeth.

Figure 6:
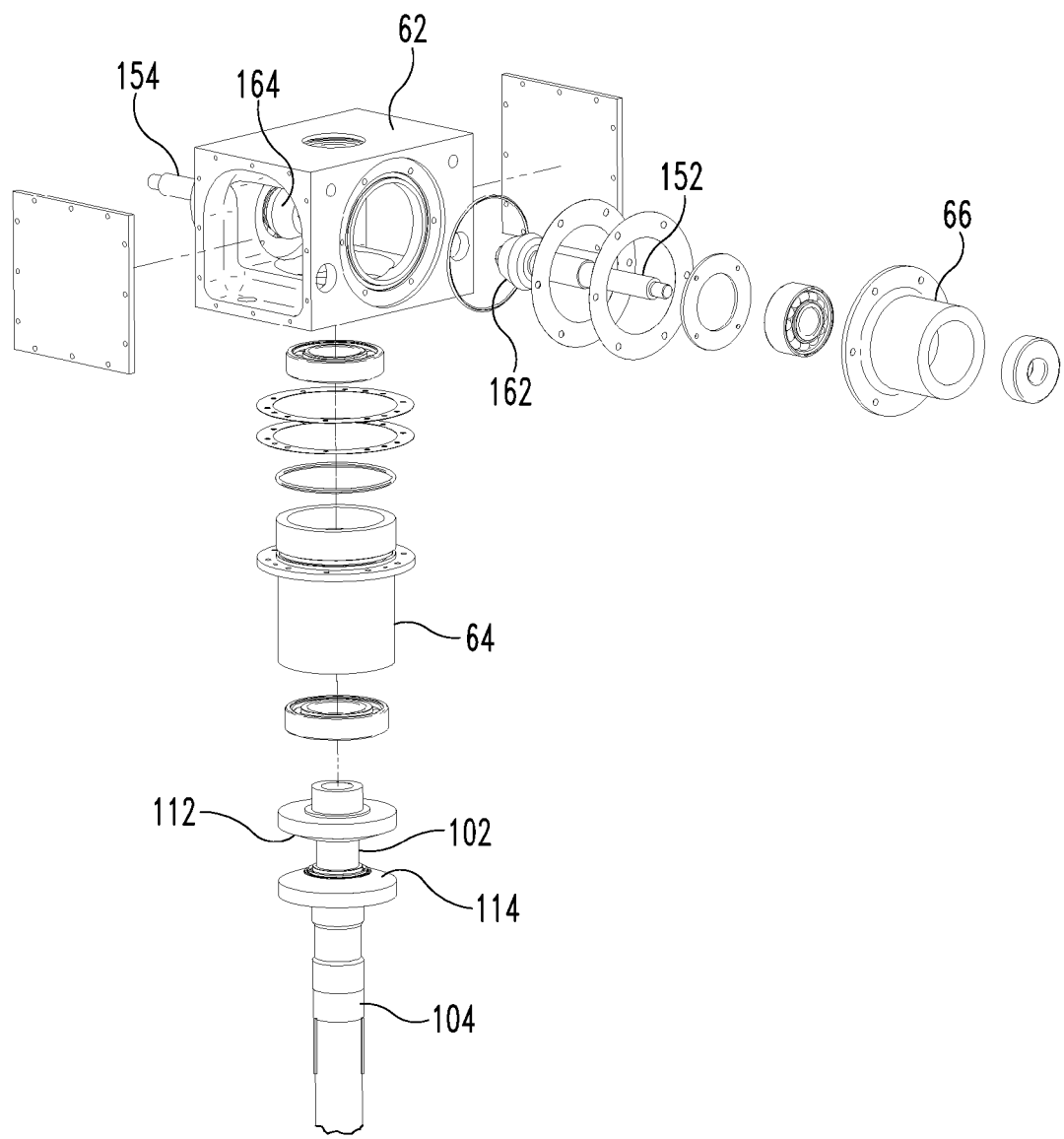
FIG. 6 is an exploded perspective assembly view of the FIG. 4 gearbox.

Output shafts 153 and 155 are coupled to friction clutches 173 and 175. Similarly, friction clutches 172 and 174 are coupled to output shafts 152 and 154 and driven gears 162 and 164 (as illustrated in FIG. 6) that are driven simultaneously with driven gears 163 and 165 by driver gears 112 and 114. Friction clutches 172, 173, 174 and 175 may be used as rotational mechanical inputs to other devices, for example, four generators. Friction clutches 172, 173, 174 and 175 permit selective engagement and disengagement of individual attached devices.

This configuration permits variations in the configuration of a wind turbine. The mechanical output from the wind turbine can be selectively divided between multiple devices. In the case of generators, this may optimized the performance of the attached generators by allowing the use of a plurality of smaller generators to harness the maximum power output from the wind turbine while permitting selected disengagement of individual units when wind conditions are not optimal.

It should be understood that FIGS. 1-3 disclose but one embodiment of a counter-rotating horizontal wind turbine and FIGS. 9-11 disclose but one embodiment of a counter-rotating vertical wind turbine. Other embodiments can be used with gear box 60. For example, many different rotor designs for counter-rotating wind turbines have been developed that can be used in lieu of the rotor configurations disclosed herein.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

I claim:
1. An apparatus comprising:
a first shaft rotationally coupled to a first power source;
a second shaft configured coaxially and counter-rotating to said first shaft,
wherein said second shaft is rotationally coupled to a second power source;
a first driver gear rotationally coupled to said first shaft;
a second driver gear rotationally coupled to said second shaft;

a first driven gear engaged with said first and second driver gears so that the point at which said first driver gear engages said first driven gear is phase shifted approximately 180 degrees from the point at which said second driver gear engages said first driven gear;

a second driven gear engaged with said first and second driver gears so that the point at which said first driver gear engages said second driven gear is phase shifted approximately 180 degrees from the point that said second driver gear engages said second driven gear;

a first load rotationally coupled to said first driven gear;

a second load; and a first clutch rotationally coupled to said second driven gear, wherein said first clutch is constructed and arranged to selectively rotationally couple said second driven gear to said second load such that said apparatus can be operated with either said first load or with both said first and second loads coupled to said first and second power sources to account for variations in said first and second power sources.

2. The apparatus of claim 1, wherein the first load is a first generator.

3. The apparatus of claim 2, wherein the second load is a second generator.

4. The apparatus of claim 3, wherein said first power source is a first wind turbine blade rotationally coupled to said first shaft; and wherein said second power source is a second wind turbine blade rotationally coupled to said second shaft.

5. The apparatus of claim 4, wherein said second wind turbine blade is constructed and arranged coaxially and counter-rotating to said first wind turbine blade.

6. The apparatus of claim 5, wherein said second wind turbine blade has a greater surface area than said first wind turbine blade.

7. The apparatus of claim 5, wherein said second wind turbine blade has a different pitch than said first wind turbine blade such that said first and second wind turbine blades rotates at substantially the same speed.

8. The apparatus of claim 4, further comprising:
a third driven gear engaged with said first driver gear and said second driver gear, wherein the engagement between said third driven gear and said second driver gear is phase shifted approximately 180 degrees from where said third driven gear engages said first driver gear; and
a second clutch rotationally coupled to said third driven gear, wherein said second clutch is constructed and arranged to selectively rotationally couple said third driven gear to a third generator.

9. The gearbox of claim 8, further comprising:
a fourth driven gear engaged with said first driver gear and said second driver gear, wherein the engagement between said fourth driven gear and said second driver gear is phase shifted approximately 180 degrees from where said fourth driven gear engages said first driver gear; and
a third clutch rotationally coupled to said fourth driven gear, wherein said third clutch is constructed and arranged to selectively rotationally couple said fourth driven gear to a fourth generator.

10. The apparatus of claim 3, wherein said first power source is a first wind turbine blade rotationally coupled to said first shaft; and wherein said second power source is a second wind turbine blade rotationally coupled to said second shaft, wherein said second wind turbine blade is arranged coaxially and counter-rotating to said first wind turbine blade.

11. The apparatus of claim 10, further comprising:

a third driven gear engaged with said first driver gear and said second driver gear, wherein the engagement between said third driven gear and said second driver gear is phase shifted approximately 180 degrees from where said third driven gear engages said first driver gear; and
a second clutch rotationally coupled to said third driven gear, wherein said second clutch is constructed and arranged to selectively rotationally couple said third driven gear to a third generator.

12. The apparatus of claim 1, wherein said first and second driver gears are beveled friction gears.

13. The apparatus of claim 12, wherein said first and second driver gears comprise a hardened steel.

14. The apparatus of claim 1, further comprising:
a third driven gear engaged with said first driver gear and said second driver gear, wherein the engagement between said third driven gear and said second driver gear is phase shifted approximately 180 degrees from where said third driven gear engages said first driver gear; and
a second clutch rotationally coupled to said third driven gear, wherein said second clutch is constructed and arranged to selectively rotationally couple said third driven gear to a third load.

15. The gearbox of claim 14, further comprising:
a fourth driven gear engaged with said first driver gear and said second driver gear, wherein the engagement between said fourth driven gear and said second driver gear is phase shifted approximately 180 degrees from where said fourth driven gear engages said first driver gear; and
a third clutch rotationally coupled to said fourth driven gear, wherein said third clutch is constructed and arranged to selectively rotationally couple said fourth driven gear to a fourth load.

16. A gearbox comprising:
a first driver gear constructed and arranged to rotate in a first direction on an axis of rotation, wherein said first driver gear is constructed and arranged to be rotationally coupled to a first power source;
a second driver gear constructed and arranged to rotate in a second direction opposite said first direction on said axis of rotation, wherein said second driver gear is constructed and arranged to be rotationally coupled to a second power source;
a first driven gear engaged with said first driver gear and said second driver gear, wherein the engagement between said first driven gear and said second driver gear is phase shifted approximately 180 degrees from where said first driven gear engages said first driver gear and wherein said first driven gear is constructed and arranged to be rotationally coupled to a first load;
a second driven gear constructed and arranged to controllably engage and disengage from said first driver gear and said second driver gear, wherein the engagement between said second driven gear and said second driver gear is phase shifted approximately 180 degrees from where said second driven gear engages said first driver gear, wherein said second driven gear may be engaged with said first and second driver gears simultaneously with said first driven gear being engaged with said first and second driver gears, wherein said second driven gear is constructed and arranged to be rotationally coupled to a second load and wherein the gearbox can be operated with either said first load or with both said first and second loads coupled to said first and second power sources by controllably engaging or disengaging said second driven gear from said first and second driver gears to account for variations in said first and second power sources.

17. The gearbox of claim 16, further comprising a third driven gear constructed and arranged to controllably engage and disengage from said first driver gear and said second driver gear, wherein the engagement between said third driven gear and said second driver gear is phase shifted approximately 180 degrees from where said third driven gear engages said first driver gear and wherein said third driven gear is constructed and arranged to be rotationally coupled to a third load.

18. The gearbox of claim 17, further comprising a fourth driven gear constructed and arranged to controllably engage and disengage from said first driver gear and said second driver gear, wherein the engagement between said fourth driven gear and said second driver gear is phase shifted approximately 180 degrees from where said fourth driven gear engages said first driver gear and wherein said fourth driven gear is constructed and arranged to be rotationally coupled to a fourth load.

19. The gearbox of claim 16, wherein said first and second driver gears are beveled friction gears.

20. A power generation system comprising:
a first wind turbine rotor;
a second wind turbine rotor;
a gearbox comprising:
   a first driver gear rotationally coupled to the first wind turbine rotor, wherein the first driver gear is constructed and arranged to rotate in a first direction on an axis of rotation;
   a second driver gear rotationally coupled to the second wind turbine rotor, wherein the second driver gear is constructed and arranged to rotate in a second direction opposite said first direction on said axis of rotation;
   a first driven gear constructed and arranged to engage said first driver gear and said second driver gear, wherein the engagement between the first driven gear and the second driver gear is phase shifted approximately 180 degrees from where the first driven gear engages the first driver gear;
   a second driven gear constructed and arranged to engage said first driver gear and said second driver gear, wherein the engagement between the second driven gear and the second driver gear is phase shifted approximately 180 degrees from where the second driven gear engages the first driver gear;
a first generator rotationally coupled to said first driven gear;
a second generator; and
a clutch rotationally coupled to said second driven gear and said second generator, wherein said clutch is constructed and arranged to selectively rotationally couple said second driven gear to said second generator such that the power generation system can be operated with either said first generator or with both said first and second generators rotationally coupled to said first and second wind turbine rotors to permit the power output of the power generation system to be optimized at various wind speeds.

21. A power generation system comprising:
a first wind turbine rotor;
a second wind turbine rotor;
a gearbox comprising:
   a first driver gear rotationally coupled to the first wind turbine rotor, wherein the first driver gear is constructed and arranged to rotate in a first direction on an axis of rotation;
   a second driver gear rotationally coupled to the second wind turbine rotor, wherein the second driver gear is constructed and arranged to rotate in a second direction opposite said first direction on said axis of rotation;
   a first driven gear engaged with said first driver gear and said second driver gear, wherein the engagement between the first driven gear and the second driver gear is phase shifted approximately 180 degrees from where the first driven gear engages the first driver gear;
   a second driven gear constructed and arranged to controllably engage and disengage from said first driver gear and said second driver gear, wherein the engagement between the second driven gear and the second driver gear is phase shifted approximately 180 degrees from where the second driven gear engages the first driver gear, wherein said second driven gear may be engaged with said first and second driver gears simultaneously with said first driven gear being engaged with said first and second driver gears;
a first generator rotationally coupled to said first driven gear;
a second generator rotation rotationally coupled to said second driven gear, wherein the gearbox can be operated with either said first generator or with both said first and second generators rotationally coupled to said first and second wind turbine rotors by controllable engaging and disengaging said second driven gear from said first and second driver gears to permit the power output of the power generation system to be optimized at various wind speeds.

* * * * *

UNITED STATES PATENT AND TRADEMARK OFFICE
CERTIFICATE OF CORRECTION

PATENT NO. : 8,664,794 B2  Page 1 of 1
APPLICATION NO. : 13/252277
DATED : March 4, 2014
INVENTOR(S) : Peter V. Bitar It is certified that error appears in the above-identified patent and that said Letters Patent is hereby corrected as shown below:

In the Claims:
In column 5, line 50, replace "gearbox" with --apparatus--
In column 6, line 26, replace "gearbox" with --apparatus--

Signed and Sealed this
Tenth Day of June, 2014

Michelle K. Lee
*Deputy Director of the United States Patent and Trademark Office*